Figure 1:
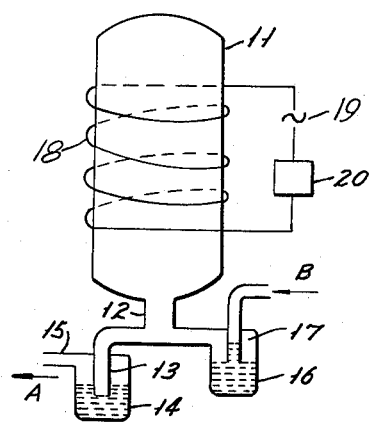

April 27, 1965  F. S. KLEIN  3,180,278

PUMP FOR FLUIDS

Filed May 24, 1962

INVENTOR.
FRITZ SHALOM KLEIN
BY
OSTROLENK, FABER, GERB & SOFFEN
ATTORNEYS

3,180,278
PUMP FOR FLUIDS
Fritz Shalom Klein, Meonoth Wolfson A.,
Rehovoth, Israel
Filed May 24, 1962, Ser. No. 199,559
1 Claim. (Cl. 103—235)

It is an object of the present invention to provide a novel pump for fluids. It is a further object of the present invention to provide a pump for corrosive fluids, radioactive materials and poisonous fluids. It is a further object of the present invention to provide a novel pump for fluids, characterized by the absence of moving parts. It is yet a further object of the present invention to provide a pump for fluids which is completely vacuum-tight and which is of very reliable performance. It is yet a further object of the present invention to provide a novel pump adapted for the circulation of fluids at a predetermined rate. Other objects will become apparent hereinafter.

The novel pump according to the present invention is of very simple construction, and due to the small number of parts its performance is a very reliable one. In fact, it can be made of one piece and when manufactured from glass, it will be completely air-tight, so as to prevent any possible leakage.

The pump is based on the well known phenomenon that gaseous media undergo a change of volume when subjected to changes of temperature. Contractions of a gaseous medium are utilized in the novel pump in order to introduce a certain predetermined quantity of fluid into a vessel through a one-way valve, while an increase of temperature of said gaseous medium in said vessel is used in order to expel part of the fluid through another one-way valve. This cycle can be repeated with a predetermined frequency of from a few strokes per second and up to one stroke per day or even less.

In practice, the most convenient form of the invention is to provide for the electric heating of a gaseous medium contained within said vessel, resulting in the expansion of the gaseous medium contained therein, and in the expulsion of part of the fluid through one of the conduits, and for the subsequent interruption of the electrical heating, resulting in the cooling of the gaseous medium confined in said vessel, resulting in a sucking in into said vessel of a corresponding quantity of fluid through the other conduit. If the change of temperature of the gaseous medium in the vessel during one cycle is $(T_2-T_1)$, and the volume of the gaseous medium is V, and the frequency of heating and cooling is $f\nu$, the rate of pumping R will be $$R = \frac{(T_2-T_1) \cdot V \cdot f\nu}{T_2}$$

It is clear that the pump is easily adaptable to a multitude of uses. The pumping rate will depend on the volume of the vessel, V, and on both the difference of temperature and the frequency of cooling and heating cycles. Any fluid medium can be pumped by means of the novel pump. In case of gaseous media, these can be pumped at any desired pressure, from partial vacuum and up to above atmospheric pressure. When thermally unstable gases are to be pumped, the pumping may be accomplished by subjecting the volume of the vessel to cooling and by permitting it subsequently to warm to ambient temperature. If a fluid is to be pumped which is not to be subjected to changes of temperature, a U-shaped tube of suitable dimensions may be introduced between the pumping volume and the conduits equipped with the check-valves, said U-shaped tube containing a suitable inert liquid.

In order that a better understanding may be had of the invention, it will now be described by way of example, referring to the enclosed drawing in which each of FIGURES 1, 2, 3 and 4 is a schematical elevational side-view of pumps according to the present invention.

As shown in FIGURE 1, a pump according to the present invention comprises a closed vessel 11, in communication with a T-shaped conduit 12. The left hand branch of the conduit 12 is bent downwards, and the bent part 13 forms part of the vessel 14 which is provided with an exit tube 15. The right hand branch of conduit 12 is in communication with a vessel 16, while a tube 17 is introduced into said vessel 16 so as to reach to a certain predetermined distance above the bottom of said vessel. The system comprising vessel 11, conduit 12, vessels 14 and 16 and tubes 15 and 17 can be made of glass so as to constitute one integral gas-tight part. A heating coil 18 is provided around vessel 11, said coil 18 being adapted to be connected to a source of electric current, 19, through means 20 adapted to provide a predetermined sequence of heating and cooling of said coil, and thereby of the gaseous medium in said vessel 11.

When the current is actuated in said heating coil 18, the gaseous medium in vessel 11 will be heated to a temperature $T_2$. In the bulb-shaped vessels 14 and 16 there is provided a certain quantity of an inert liquid, such as mercury, so as to cover the lower end of the tubes 13 and 17, respectively. The gaseous medium in vessel 11 will expand when heated, and a corresponding part of it will bubble through the mercury at the bottom of vessel 14, and will stream in the direction of the arrow A through tube 15. When the heating is interrupted, the gaseous medium in vessel 11 will cool to temperature $T_1$, contract and gas will be sucked in through tube 17, streaming in the direction of arrow B. It is clear that when the gaseous medium is heated, it will not be able to stream in the opposite direction, as this would tend to press the mercury in vessel 16 up into the central tube. When the gaseous medium in vessel 11 is contracting, gas will be sucked in through vessel 16, while none will be able to enter through vessel 14 because of analogous reasons.

Figure 2:
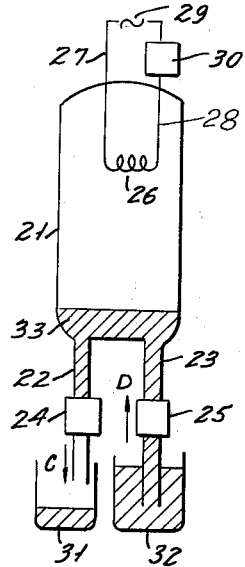

In FIGURE 2 there is shown another embodiment of the present invention. This pump comprises in combination a closed vessel 21, in communication with two conduits 22 and 23, provided with check-valves 24 and 25, permitting the flow of fluids in the direction of arrows C and D, respectively. Into vessel 21 there is sealed in a heating coil 26, which is connected by conductors 27 and 28 to the current source 29 and to the interrupting means 30. When the power is on, there will be a flow of fluid through conduit 22 into vessel 31, while when the current is off, there will be a flow of fluid through conduit 23 into vessel 21 from vessel 32. It is clear that the pumped fluid 33 can be a liquid.

Figure 3:
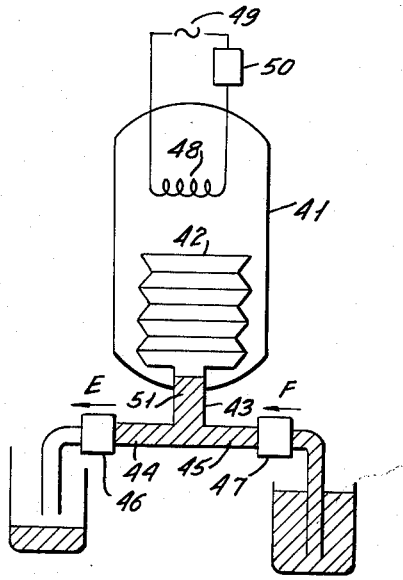

As shown in FIGURE 3, the pump comprises a vessel 41, containing a sealed-in metal bellows 42, which is in communication with tube 43 which branches off into the two tubes 44 and 45, provided with one-way valves 46 and 47 respectively, permitting the flow of a fluid in direction of arrows E and F, respectively. Into the vessel 41 there is sealed in a heating coil 48, connected with electric current source 49 and with interrupting means 50. When the heating coil will be heated, the volume of the gaseous medium confined in the vessel 41 will expand, bringing about a contraction of bellows 42, so as to expel fluid 51 through conduit 44. When the heating is interrupted, the gaseous medium in vessel 41 will contract, bringing about a sucking in of fluid through conduit 45 into the lower part of the bellows 42. This cycle may be repeated at any desired frequency. Bellows 42 can be filled with gas or the pumped liquid.

Figure 4:
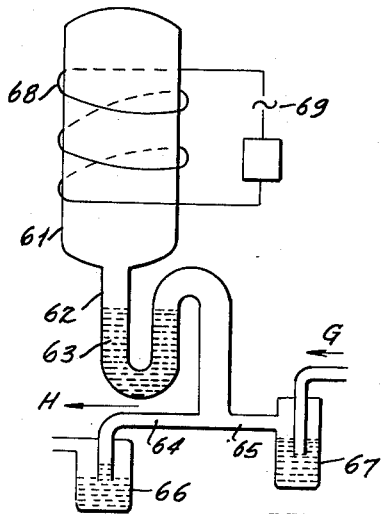

In FIGURE 4 there is shown a further embodiment of the invention, which is preferably used when it is not desired to subject the pumped fluid to any substantial changes of temperature. This embodiment comprises a vessel 61, in communication with U-tube 62, containing mercury or any other inert liquid 63, and from which there branch off two conduits 64 and 65 containing respectively one-way valves 66 and 67, which permit flow of fluid in the direction of arrows H and G respectively. Around vessel 61 there is provided a heating coil 68 which can be heated by means of electric current from current source 69. In this case heating of the gaseous medium in vessel 61 brings about a downward movement of the mercury or other inert liquid in the left-hand branch of the U-tube 62, resulting in the expulsion of fluid through conduit 64, while a cooling of the gaseous medium in vessel 61 results in a sucking-in of a corresponding quantity of fluid through conduit 65.

It is self-understood that such pumps can be used as circulation pumps for various fluids. They may be used for the circulation of radioactive gases and liquids. When used for pumping corrosive fluids, the material of construction of the pump and check-valves and the liquid contained in traps, if used, must be adjusted accordingly. When halogens are pumped, certain fluorinated hydrocarbons can be used in the traps, while sulfuric acid may be used with hydrogen chloride. When hydrogen fluoride, fluorine or similar compounds are pumped, the pump can be made from suitable metal.

The adjustment of the heating and cooling frequency can be effected by any suitable switch. Amongst others there may be mentioned Sunvic Regulating Units (type TYB) connected to the heating element or simple bimetallic fuses. When a sealed-in thin platinum wire is used as heating coil, a frequency of heating and cooling of up to about 2 cycles per second can be attained. With this arrangement a push-pull circuit comprising two telephone relays and two condensers is advantageously used.

What I claim is:

A pump actuated by the thermal expansion and contraction of a first fluid for effecting flow of a second fluid isolated from said first fluid, which comprises:

(a) an inlet reservoir filled to a first level with said second fluid;
(b) an inlet conduit extending into the inlet reservoir to a point beneath said first level;
(c) a central conduit communicating with said inlet conduit, and with the outlet conduit set forth hereinafter;
(d) a one-way inlet valve connecting the inlet conduit to the central conduit for admitting said second fluid into the central conduit from the inlet conduit and the inlet reservoir;
(e) an outlet reservoir filled to a second level, lower than said first level, with said second fluid;
(f) an outlet conduit extending into the outlet reservoir to a point above said second level;
(g) a one-way outlet valve connecting the outlet conduit to the central conduit for admitting said second fluid into the outlet conduit and the outlet reservoir from the central conduit;
(h) a flexible bellows connected at its open end to said central conduit for varying the fluid pressure therein;
(i) a heating chamber enclosing said bellows and containing said first fluid, the expansion and contraction of said fluid being sufficient to effect the corresponding contraction and expansion, respectively, of said bellows; and
(j) heating means for heating the first fluid in said heating chamber to thereby effect expansion and contraction of said fluid.

References Cited by the Examiner

UNITED STATES PATENTS

| 594,956 | 12/97 | Livermore | 103—255 |
| 1,192,371 | 7/16 | Beckett | 103—255 |
| 1,630,943 | 5/27 | Hutton | 230—228 |
| 2,241,620 | 5/41 | Shoeld | 103—255 |
| 2,954,741 | 10/60 | Kleen | 103—255 |
| 3,065,712 | 11/62 | Buchanan et al. | 103—55 |

FOREIGN PATENTS

| 159,043 | 9/54 | Australia. |
| 1,128,445 | 8/56 | France. |

LAURENCE V. EFNER, *Primary Examiner*.